United States Patent
Park et al.

(10) Patent No.: US 6,910,157 B1
(45) Date of Patent: Jun. 21, 2005

(54) PORTABLE COMPUTER SYSTEM FOR INDICATING POWER-ON SELF-TEST STATE ON LED INDICATOR

(75) Inventors: Jang-Ho Park, Suwon (KR); Dong-Wook Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 634 days.

(21) Appl. No.: 09/617,140

(22) Filed: Jul. 14, 2000

(30) Foreign Application Priority Data

Jul. 16, 1999 (KR) ........................................ 1999/28925

(51) Int. Cl.[7] .............................................. G06F 11/00
(52) U.S. Cl. ............................................. 714/36; 713/1
(58) Field of Search .............................. 714/36; 713/1, 713/2; 324/556; 345/39, 59

(56) References Cited

U.S. PATENT DOCUMENTS

| | | | |
|---|---|---|---|
| 5,327,435 A | * 7/1994 | Warchol | 714/36 |
| 5,459,671 A | * 10/1995 | Duley | 702/63 |
| 5,471,674 A | * 11/1995 | Stewart et al. | 713/2 |
| 5,553,294 A | * 9/1996 | Nanno et al. | 713/340 |
| 5,646,535 A | * 7/1997 | Dornier | 324/556 |
| 5,699,508 A | * 12/1997 | Khashayar | 714/42 |
| 5,704,035 A | 12/1997 | Shipman | |
| 5,742,616 A | 4/1998 | Torreiter et al. | |
| 5,850,546 A | * 12/1998 | Kim | 713/1 |
| 5,850,562 A | * 12/1998 | Crump et al. | 713/1 |
| 5,860,001 A | 1/1999 | Cromer et al. | |
| 5,978,913 A | 11/1999 | Broyles et al. | |
| 6,035,355 A | 3/2000 | Kelley et al. | |
| 6,052,800 A | 4/2000 | Gentile et al. | |
| 6,070,255 A | 5/2000 | Dell et al. | |
| 6,073,255 A | 6/2000 | Nouri et al. | |
| 6,212,651 B1 | * 4/2001 | Schieve et al. | 714/36 |
| 6,275,935 B1 | * 8/2001 | Barlow et al. | 713/182 |
| 6,363,492 B1 | * 3/2002 | James et al. | 714/1 |
| 6,434,696 B1 | * 8/2002 | Kang | 713/2 |
| 6,687,854 B1 | * 2/2004 | Liu | 714/25 |

OTHER PUBLICATIONS

Korean Office Action of the Korean Patent Publication No. 1999–28925, issued on Dec. 22, 2004 (English translation attached).

* cited by examiner

Primary Examiner—Robert Beausoliel
Assistant Examiner—Christopher McCarthy
(74) Attorney, Agent, or Firm—Robert E. Bushnell, Esq.

(57) ABSTRACT

A portable computer system has a light emitting diode (LED) indicator including multiple LEDs to display a power-on self-test (POST) state and an operating state of the computer system. When the portable computer system performs a POST process during system boot, the LEDs of the LED indicator are lighted in response to each step of the POST process. If any error is detected in the POST process, the POST process is stopped with lighting LEDs. The lighting state of the LED indicator indicates where the error has occurred in the computer system, so that a user can verify which element of the computer system has an error, without additionally adding a POST card to the computer system.

8 Claims, 5 Drawing Sheets

PORTABLE COMPUTER SYSTEM FOR INDICATING POWER-ON SELF-TEST STATE ON LED INDICATOR

CLAIM OF PRIORITY

This application makes reference to, incorporates the same herein, and claims all benefits accruing under 35 U.S.C. § 119 from my application PORTABLE COMPUTER SYSTEM FOR INDICATING POWER-ON SELF-TEST STATE ON LED INDICATOR filed with the Korean Industrial Property Office on 16 Jul. 1999 and there duly assigned Serial No. 28925/1999.

BACKGROUND OF THE INVENTION

1. Field of the Invention

The present invention relates to a data processing system, and more particularly to a portable computer system with a diagnostic routine.

2. Related Art

When a computer system is first turned on, a Basic Input/Output System (BIOS) is enabled. A BIOS program is a set of programs usually stored permanently in a read only memory (ROM) that provides the most basic control and management of the computer's hardware. The first job of a BIOS program is to initialize and to configure the computer hardware when the user turns on the computer (i.e., system boot). The BIOS program runs a startup program called a Power-On Self-Test (POST) program.

POST is a sequence of program routines built into the motherboard's ROM (i.e., BIOS). The POST tests vital system parts at the time of power-on. These specific tests scrutinize the main elements in the system such as CPU (central processing unit), ROM (read only memory), motherboard support circuitry, memory, keyboard, video, hard and floppy drives, etc. An example of the POST process is disclosed in U.S. Pat. No. 5,704,035 for Computer Method/Apparatus for Performing a Basic Input/Output System (BIOS) Power on Test (POST) That Uses Three Data Patterns and Variable Granularity issued to Shipman, issued on Dec. 30, 1997. When a fault is discovered in the POST process, the BIOS provides a warning or error message. Three types of output messages including audio codes, display screen messages and test codes are provided. The test codes are POST codes sent to an input/output (I/O) port address (e.g., I/O port 80h) at the start of each test. For example, in AwardBIOS™ Version 4.51PG of Phoenix Technologies, Ltd., Extended Industry Standard Architecture (EISA) POST codes are typically outputted to port address 300h and Industry Standard Architecture (ISA) POST codes are outputted to port address 80h.

A special adapter card plugged into a system slot can decode the POST codes. These codes pinpoint each element tested by POST. During the POST process, two-digit numeric codes are passed to the adapter's display. If the POST cycle stops unexpectedly, the two-digits displayed on the card indicates where the test has failed, and therefore points an accusing finger at the faulty component. Generally, the adapter card is called a POST card.

Many commercial POST cards exist to inform the user of the POST codes. The majority of these display the codes on a pair of seven segment displays, and the user has to then look up their meaning. The POST card can be used in a computer system including an 80286, 80386, 80486 or PENTIUM micro-processors with an ISA or an EISA bus.

Generally, the POST card is provided in the shape of an add-in card plugged in an extension slot. For example, in case of a desktop computer, the POST card can be easily plugged in the extension slot, since the majority of desktop computers fundamentally equip the extension slot inside of them.

However, in case of a portable computer, such as a laptop computer and a notebook computer, the POST card is plugged in an extension slot coupled to a docking station. Therefore, the docking station is required essentially to plug the POST card. For example, if the docking station is not coupled to the portable computer system, the POST card cannot be plugged in the portable computer system. In that case, it is impossible to display the POST codes to a user. Thus, it is hard to identify where the error occurred in the computer system.

Exemplar of the art are U.S. Pat. No. 6,073,255 for Method of Reading System Log issued to Nouri et al., U.S. Pat. No. 6,035,355 for PCI System and Adapter Requirements Following Reset issued to Kelley et al., U.S. Pat. No. 6,070,255 for Error Protection Power-on-self-test for Memory Cards having ECC on Board issued to Dell et al., U.S. Pat. No. 5,860,001 for Computer System having at Least Two Boot Sequences issued to Cromer et al., U.S. Pat. No. 5,978,913 for Computer with Periodic Full Power-on Self Test issued to Broyles et al., U.S. Pat. No. 6,052,800 for Method and System for Updating Information on an Intelligent Display Device Monitoring a Computer System issued to Gentile et al., U.S. Pat. No. 5,742,616 for System and Method Testing Computer Memories issued to Torreiter et al. disclose methods and devices' to perform power-on self-tests. We have noticed that the art does not show a device that displays the POST states in an easily manageable fashion.

SUMMARY OF THE INVENTION

It is therefore an object of the present invention to provide a portable computer system for informing POST state to a user through an LED (light emitting diode) indicator.

It is another object to provide a POST code display method of a portable computer system for informing POST state to a user through an LED indicator.

It is yet another object to provide a way of showing the POST state without using the display monitor of a portable computer system.

It is still yet another object to provide a quick and easy way of monitoring the POST state without extra attachments to a portable computer system.

It is another object to have POST code display that a user can recognize the location of the faulty part in a portable computer without referencing additional literature showing the location of the error.

In order to attain the above objects, according to an aspect of the present invention, there is provided a portable computer system having an LED indicator including a plurality of lighting devices, and a micro-controller for controlling the LED indicator to display POST codes in response to operating states of the portable computer system.

According to another aspect of this invention, there is provided a method for displaying POST codes in a portable computer system. The method has the steps of starting the POST process; generating POST codes; outputting the POST codes to a microprocessor to display the POST codes; testing each of elements of the portable computer system corresponding to the respective POST codes; determining whether the test is performed in safety; completing the POST process, if the test is performed in safety in all of the elements; and interrupting the POST process, if the testis not performed in safety in any element. The outputted POST codes are displayed through an LED indicator.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
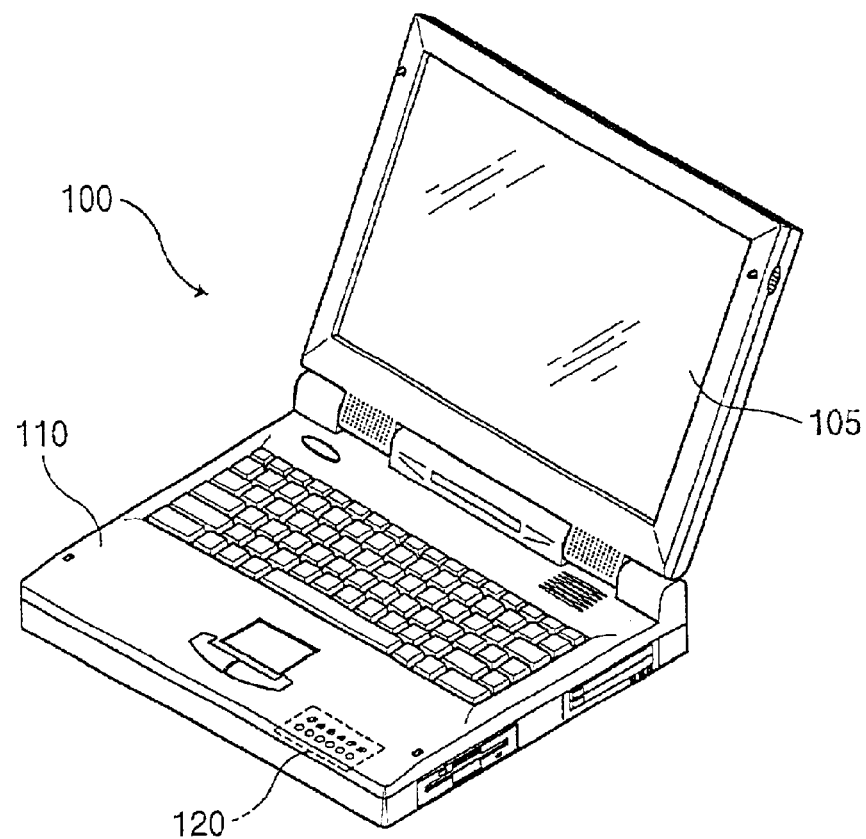
FIG. 1 is an exterior view of a portable computer system.

Turning now to the drawings, FIG. 1 is an exterior view for illustrating a portable computer system 100 including a liquid crystal display (LCD) panel 105 and a main body 110. In addition, the portable computer system 100 includes a light emitting diode (LED) indicator 120. The LED indicator 120 is composed of a plurality of LEDs for illustrating operating states of a hard disk drive or a floppy disk drive, and so on. Such LEDs are arranged in series on a surface of the portable computer system 100. Referring to FIG. 1, an LED indicator 120 is located in upper part of the main body 110. However, the LED indicator 120 is capable of being located in any one side of the main body 110.

Figure 2:
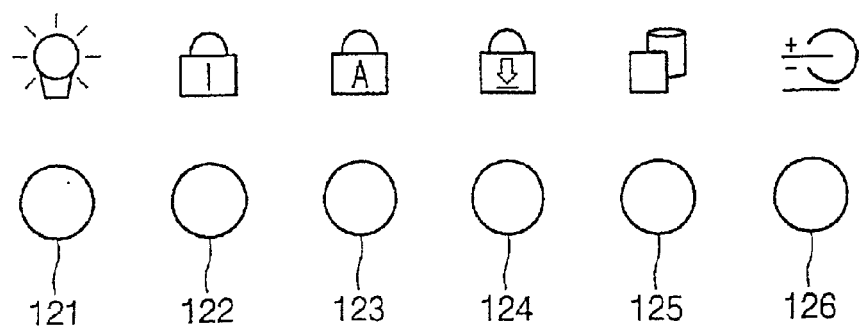
FIG. 2 is an enlarged diagram for illustrating the LED indicator shown in FIG. 1.

FIG. 2 is an enlarged diagram for illustrating the LED indicator 120 shown in FIG. 1. As shown in FIG. 2, the LED indicator 120 has a plurality of LEDs 121, 122, 123, 124, 125 and 126. The LEDs indicate a power on/off state 121, a number lock state 122, a capital letter lock state 123, a scroll lock state 124, an access state of a hard disk drive, a floppy disk drive or a CD-ROM drive 125, and a charge state of a battery 126, respectively.

A portable computer system according to the present invention displays POST codes generated in a POST process through the LED indicator 120 by lighting corresponding LEDs. When the POST process is performed, each of LEDs are lighted in response to the POST codes. According to the lighting state of the LED indicator 120, a user can identify current processing steps of the POST process. In addition, when the POST process is stopped because of a detected hardware error, a user can verify which component of the computer system has an error by the LED indicator 120.

Figure 3:
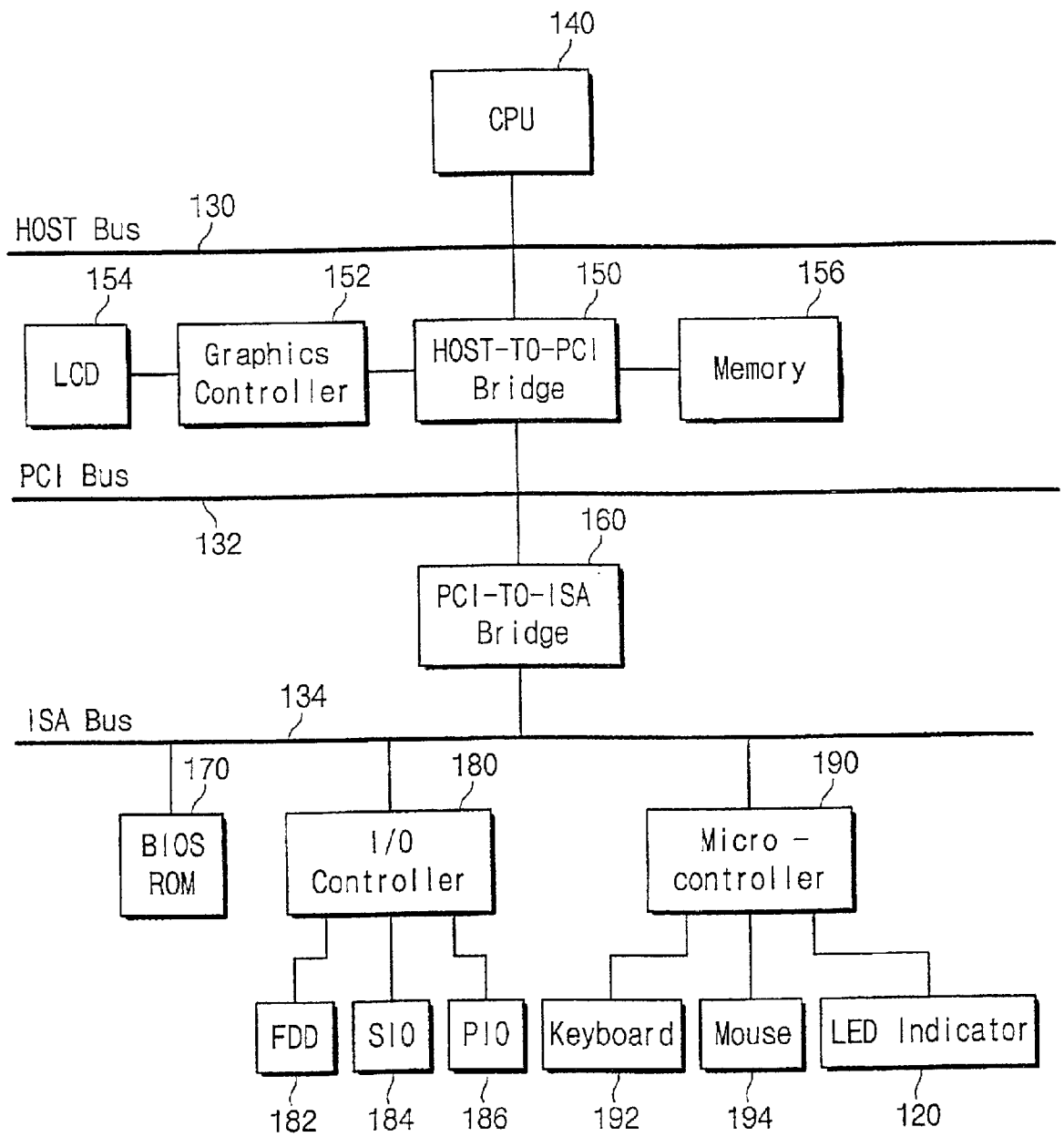
FIG. 3 is a block diagram for illustrating a structure of a portable computer system according to a first embodiment of the present invention.

FIG. 3 is a block diagram for illustrating a structure of a portable computer system according to a first embodiment of the present invention. Referring to FIG. 3, the computer system has a central processing unit (CPU) 140 coupled to a HOST bus 130, a HOST-TO-PCI bridge controller 150 coupled between the HOST bus 130 and a PCI (Peripheral Component Interconnection) bus 132, and a PCI-TO-ISA bridge controller 160 coupled between the PCI bus 132 and an ISA bus 134.

To the HOST-TO-PCI bridge controller 150, a graphics controller 152 and a memory 156 are coupled, respectively. The graphics controller 152 is coupled to a liquid crystal display (LCD) 154. To the ISA bus 134, a BIOS ROM 170, an I/O controller 180 and a micro-controller 190 are coupled, respectively. The I/O controller 180 is coupled to a floppy disk drive (FDD) 182, a serial input output (SIO) port 184 and a parallel input output (PIO) port 186, respectively. In addition, the micro-controller 190 is coupled to a keyboard 192, a mouse 194, and an LED indicator 120, respectively.

The computer system performs a POST process when the system is powered on or reset. In the POST process, the BIOS 170 generates POST codes to I/O ports 80h and 64h, respectively. The I/O port 80h is assigned for an external POST card (not shown), and the I/O port 64h is assigned for the micro-controller 190. The micro-controller 190 receives POST codes through the I/O port 64h during the POST process, and controls the LED indicator 120 to indicate the POST codes by lighting the LEDs.

Figure 4:
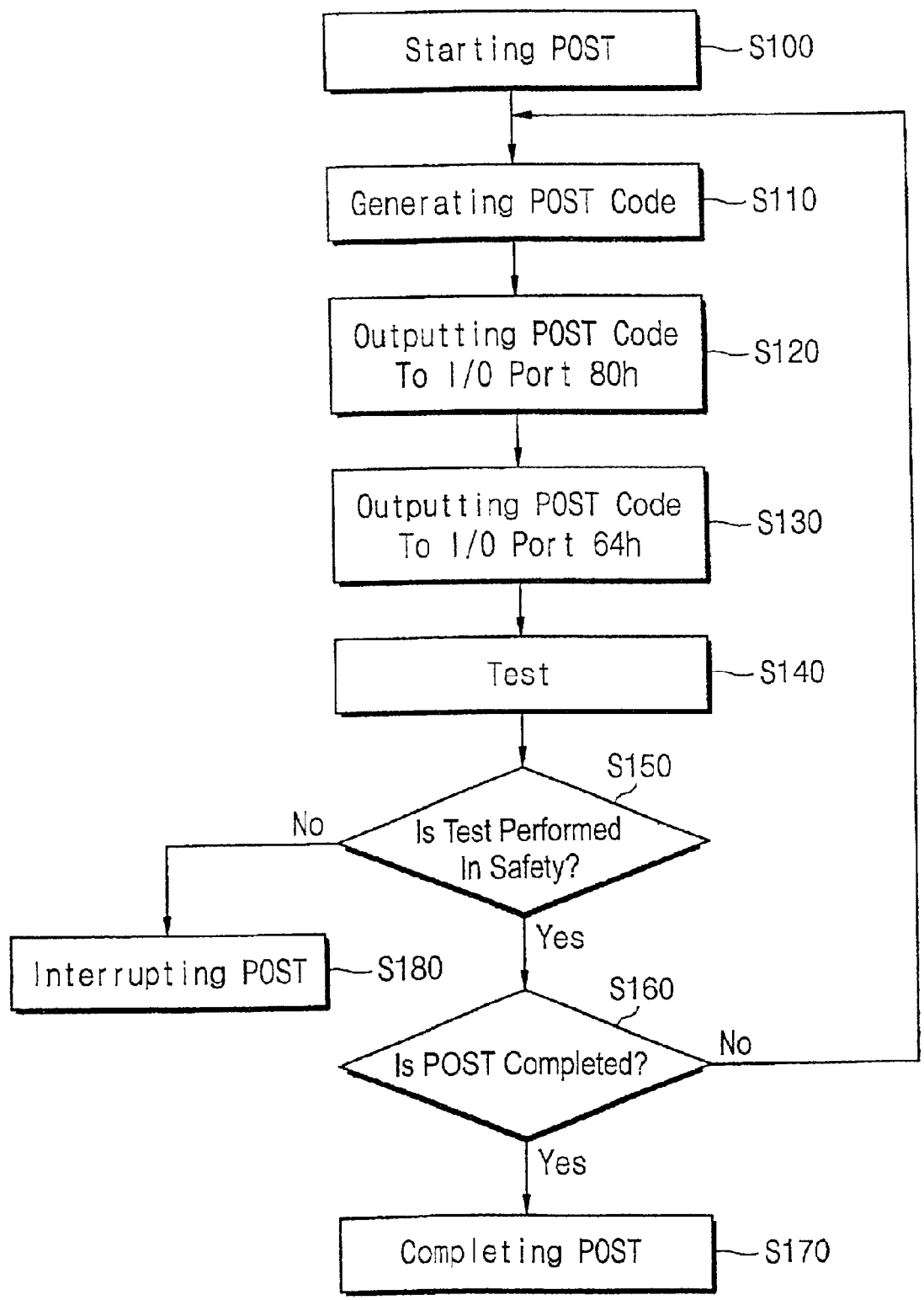
FIG. 4 is a flowchart for illustrating POST process performed in the portable computer system shown in FIG. 3.

FIG. 4 is a flowchart for illustrating POST process performed in the portable computer system shown in FIG. 3. Referring to FIG. 4, the portable computer system according to the present invention performs diagnostic routines (i.e., the POST process) stored in the BIOS 170, under control of the CPU 140. At step S100, POST process is started, and a POST code is generated in step S110. In that case, the POST code corresponds to a component to be tested in the POST process. At step S120, the generated POST code is outputted to the I/O port 80h. In addition, at step S130 the POST code being the same as the POST codes of the I/O port 80h is outputted to the I/O port 64h.

Continually, at step S140, a test is performed for an element of the portable computer system corresponding to the POST code, such as a memory, various kinds of drives, a graphics controller, and various kinds of chip sets. At step S150, it is determined whether the test is performed in safety. If so, the control flow proceeds to the next query step S160, where it is determined whether the POST process is completed. In other words, at step S160, it is determined whether all components of the portable computer system are tested. If any component is not tested yet, the control flow continues to step S110, where the POST process is performed, continually. In addition, if all components have been tested, the control flow continues to step S170, where the POST process is completed. However, if the test is not performed in safety in step S150, the control flow proceeds to step S180, where the POST process is interrupted.

As described above, the micro-controller 190 receives the POST codes through the I/O port 64h, and displays the POST codes by lighting the LEDs of the LED indicator 120 in accordance with the POST process.

Figure 5:
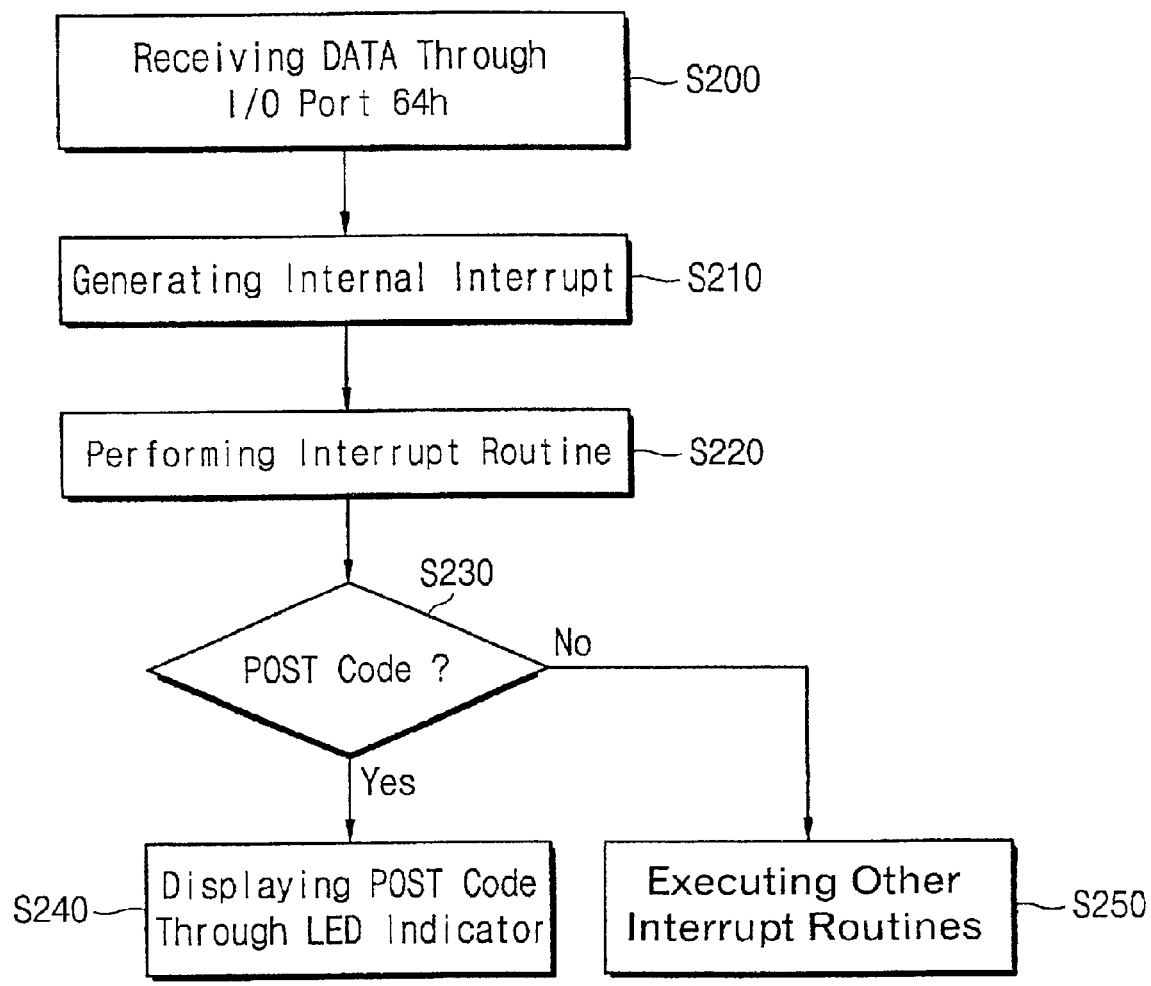
FIG. 5 is a flowchart for illustrating control process of the micro-processor to display the POST codes through the LED indicator.

A control process of the micro-processor 190 for displaying the POST codes is illustrated in FIG. 5. Referring to FIG. 5, at step S200 the micro-controller 190 receives data through the I/O port 64h. At step S210, the micro-controller 190 generates an internal interrupt, when the data is inputted to the micro-controller 190. Continually, at step S220, the interrupt routine is performed. At step S230, it is determined whether the input data from the I/O port 64h is a POST code. If so, the control flow proceeds to step S240, where the micro-controller 190 controls the LED indicator 120 to display the POST code. If not, the control flow proceeds to step S250, where the micro-processor 190 executes other interrupt routines.

As described above, the micro-controller 190 displays the POST codes from the I/O port 64h, through the LED indicator 120. If the POST process is stopped by any detected error, a user can identify where the error has occurred in the computer system by the lighting state of the LED indicator 120.

According to the first embodiment of the present invention, the LED indicator 120 displays the POST codes, continually, during the POST process. However, it is possible to display the POST codes via the LED indicator 120, selectively, when a user wants. As shown in FIG. 3, the micro-processor 190 is coupled to the keyboard 192 so as to process key inputs. The micro-processor 190 can control the LED indicator 120 to indicate the POST code by lighting the LEDs, when a predetermined specific key code is inputted through the keyboard 192. One of the input keys of the keyboard is assigned as an input key to input the specific key code.

Figure 6:
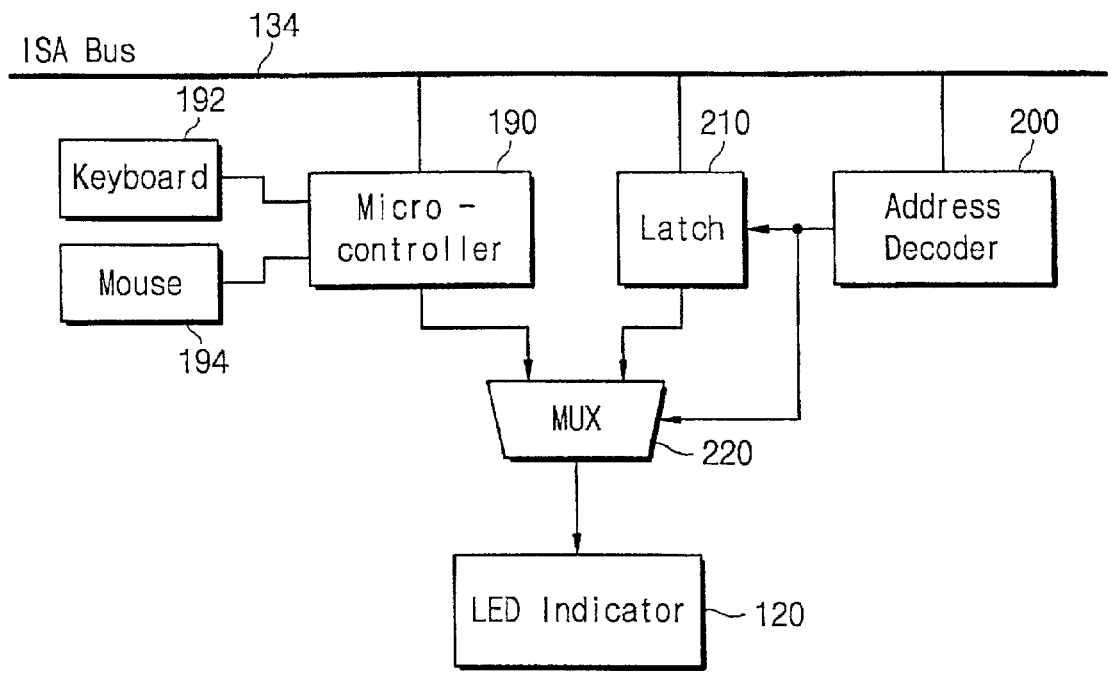
FIG. 6 is a block diagram for illustrating a structure of a circuit to control the LED indicator according to a second embodiment of the present invention.
Figure 7:
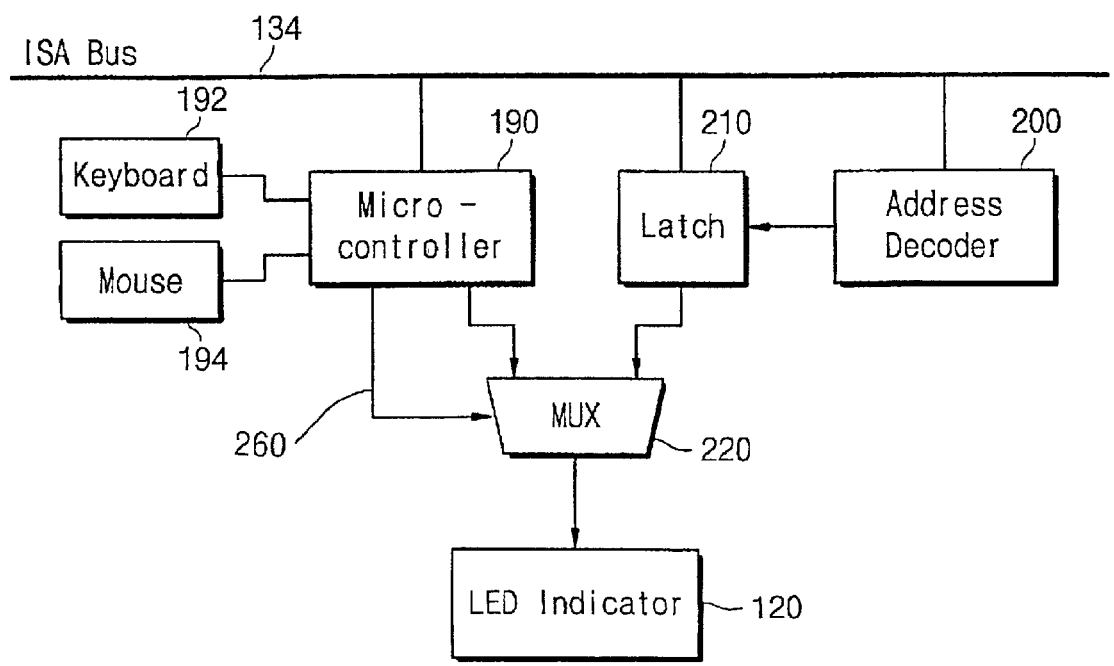
FIG. 7 is a block diagram for illustrating a modified structure of the circuit shown in FIG. 6.

FIG. 6 is a block diagram for illustrating a structure of a circuit to control the LED indicator 120 according to a second embodiment of the present invention. The circuit of FIG. 7 that modifies the circuit of FIG. 6, is capable of indicating POST codes to the LED indicator 120, selectively. In FIGS. 6 and 7, the same parts as those shown in FIG. 3 are represented with like reference numerals and to avoid description duplication.

Referring to FIG. 6, the portable computer system has an address decoder 200 coupled to an ISA bus 134, a latch 210 and a multiplexer (MUX) 220, to indicate POST codes to the LED indicator 120.

The address decoder 200 coupled to an address bus of the ISA bus 134 decodes an address signal from the ISA bus 134. The address decoder 200 enables the latch 210 when an address signal is loaded to the I/O port 80h. The latch 210 coupled to a data bus of the ISA bus 134 latches a data from the ISA bus 134, when the latch 210 is enabled by the address decoder 200. The multiplexer 220 receives outputs of the micro-controller 190 and the latch 210, and outputs one of the data to the LED indicator 120, selectively. An output signal of the address decoder 200 is provided to the multiplexer 220 as a selection signal. The latched data of the latch 210 is outputted to the LED indicator 120 through the multiplexer 220 in response to the selection signal.

When the portable computer system is powered on or reset, the POST process is performed by the BIOS, and POST codes generated in the POST process are outputted to the 110 port 80h. When the address signal of the I/O port 80h is loaded to the ISA bus 134, the latch 210 is enabled. The latch 210 latches the POST codes from the ISA bus 134. The multiplexer 220 outputs the latched POST codes to the LED indicator 120 to indicate the POST codes. After completing the POST process, an output direction of the multiplexer 220 is converted so as to output an LED indicator control signal to the LED indicator 120, where the LED indicator control signal is delivered from the micro-controller 190.

During the above described POST process according to the second embodiment of the present invention, the POST codes are displayed, continually, through the LED indicator 120. However, the POST codes can be displayed, selectively, when a user wants. An example of a circuit for selective display of POST codes is illustrated in FIG. 7. Referring to FIG. 7, the micro-controller 190 controls the output of the multiplexer 220. The micro-controller 190 coupled to a keyboard 192, processes a key input 260 from the keyboard 192. A specific key of the keyboard 192 is assigned to display the POST codes. In case of inputting the assigned specific key in the POST process, the micro-controller 190 switches the output of the multiplexer 220, so that the latched data (i.e., POST code) of the latch 210 is displayed through the LED indicator 120. In other words, POST codes of the POST process are displayed through the LED indicator 120 when a user wants the display. Therefore, the user can verify where the error has occurred in the computer system according to the lighting state of the LED indicator 120.

As described above, POST error can be verified through the LED indicator 120 without an additional POST card. Therefore, a test of the portable computer can be performed, easily, in developing or producing of the portable computer without an additional post card.

It should be understood that the description of the preferred embodiments is merely illustrative and that it should not be taken in a limiting sense. In the above detailed description, several specific details are set forth in order to provide a thorough understanding of the present invention. It will be obvious, however, to one skilled in the art that the present invention may be practiced without these specific details.

While the invention has been described in terms of an exemplary embodiment, it is contemplated that it may be practiced as outlined above with modifications within the spirit and scope of the appended claims.

What is claimed is:

1. A portable computer system, comprising:
   an address decoder coupled to an address bus generating a latch control signal by decoding an address of an output port accommodating power-on self-test codes;
   a latch coupled to a data bus of the portable computer system latching the power-on self-test codes from the data bus in response to the latch control signal;
   an indicating device having a plurality of lighting devices indicating operating states: of the portable computer system;
   a controller generating an indicating control signal in response to the operating state; and
   a selector sending either the indicating control signal or power-on self-test codes of the latch to said indicating device.

2. The portable computer system of claim 1, with the latched power-on self-test codes being outputted to the indicating device when the address decoder translates the address of the output port for power-on self-test codes.

3. The portable computer system of claim 1, with the controller managing the selector to output the power-on self-test codes latched in the latch during the power-on self-test process.

4. The portable computer system of claim 3, further comprising a key input device coupled to the controller, said controller regulating the selector to output the power-on self-test codes held temporarily until a key input signal response from the key input device during the power-on self-test process.

5. The portable computer system of claim 4, with the key input device being a keyboard of the portable computer system.

6. The portable computer system of claim 5, with said selector being a multiplexer, the output of said multiplexer being controlled by the controller.

7. The portable computer of claim 6, with the lighting devices being a plurality of light emitting diodes displaying the power-on self-test codes in accordance with an order of the power-on self-test process.

8. A computer, comprising:

an address decoder coupled to an address bus generating a latch control signal by decoding an address of an output port accommodating power-on self-test codes;

a latch coupled to a data bus of the computer latching the power-on self-test codes from the data bus in response to the latch control signal;

an indicating device having a plurality of lighting devices indicating operating states of the computer;

a controller generating an indicating control signal in response to the operating state; and a selector sending either the indicating control signal or power-on self-test codes of the latch to said indicating device.

* * * * *